(12) United States Patent
Zhang et al.

(10) Patent No.: US 11,098,219 B2
(45) Date of Patent: Aug. 24, 2021

(54) POLYMER MIXTURE, MULTILAYER ARTICLE CONTAINING THE SAME, AND PROCESS OF PREPARING THE MULTILAYER ARTICLE

(71) Applicant: Dow Global Technologies LLC, Midland, MI (US)

(72) Inventors: Liang Zhang, Shanghai (CN); Wei Li, Shanghai (CN); Jingui Jiang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 174 days.

(21) Appl. No.: 15/537,565

(22) PCT Filed: Dec. 22, 2014

(86) PCT No.: PCT/CN2014/094482
§ 371 (c)(1),
(2) Date: Jun. 19, 2017

(87) PCT Pub. No.: WO2016/101093
PCT Pub. Date: Jun. 30, 2016

(65) Prior Publication Data
US 2018/0016463 A1 Jan. 18, 2018

(51) Int. Cl.
| | | |
|---|---|---|
| *B32B 27/32* | (2006.01) |
| *C09D 133/08* | (2006.01) |
| *B32B 27/30* | (2006.01) |
| *C09D 175/04* | (2006.01) |
| *C08G 18/62* | (2006.01) |
| *C08G 18/48* | (2006.01) |
| *C08G 18/40* | (2006.01) |
| *C08J 9/00* | (2006.01) |
| *C08G 18/00* | (2006.01) |
| *C08J 9/30* | (2006.01) |
| *C08G 18/70* | (2006.01) |
| *C08J 9/14* | (2006.01) |
| *E01C 13/00* | (2006.01) |
| *C08G 101/00* | (2006.01) |

(52) U.S. Cl.
CPC ............ *C09D 133/08* (2013.01); *B32B 27/30* (2013.01); *C08G 18/003* (2013.01); *C08G 18/4063* (2013.01); *C08G 18/4833* (2013.01); *C08G 18/6212* (2013.01); *C08G 18/6283* (2013.01); *C08G 18/706* (2013.01); *C08J 9/0023* (2013.01); *C08J 9/0061* (2013.01); *C08J 9/142* (2013.01); *C08J 9/30* (2013.01); *C09D 175/04* (2013.01); *E01C 13/00* (2013.01); *B32B 2264/0207* (2013.01); *C08G 2101/00* (2013.01); *C08J 2201/026* (2013.01); *C08J 2201/0504* (2013.01); *C08J 2333/06* (2013.01); *C08J 2333/08* (2013.01); *C08J 2417/00* (2013.01)

(58) Field of Classification Search
CPC ....... B05D 2602/00; B32B 5/18; B32B 15/20; B32B 2264/0207; C08J 9/30; C08J 3/20; C08J 3/212; C08J 2407/00; C08J 2417/00; C08J 2419/00; C08J 2421/00; C08K 2201/005; C08K 2201/003; C08L 17/00; C08L 19/003; C08L 33/08; C08L 33/10; C08L 33/12; C09D 7/66; C09D 117/00; Y10T 428/254
See application file for complete search history.

(56) References Cited

U.S. PATENT DOCUMENTS

| | | | |
|---|---|---|---|
| 6,174,948 B1 | 1/2001 | Thames et al. | |
| 8,051,950 B2 * | 11/2011 | Alston | B60R 13/08 181/290 |
| 2006/0003104 A1 * | 1/2006 | Chao | B05D 7/542 427/372.2 |
| 2007/0088121 A1 * | 4/2007 | Miyawaki | C08L 33/18 524/832 |
| 2007/0218291 A1 | 9/2007 | Chiou et al. | |
| 2011/0060066 A1 * | 3/2011 | Yokota | C09D 5/02 521/149 |
| 2011/0236605 A1 * | 9/2011 | Hattori | C08G 18/6216 428/1.55 |
| 2013/0084403 A1 | 4/2013 | Tessari et al. | |

FOREIGN PATENT DOCUMENTS

| | | |
|---|---|---|
| CN | 101045641 A | 10/2007 |
| CN | 101845785 A | 9/2010 |
| CN | 102733289 A | 10/2012 |
| FR | 2561639 A1 | 9/1985 |
| GB | 657527 A | 9/1951 |

OTHER PUBLICATIONS

Search report from corresponding European 14908664.7 application, dated Jun. 6, 2018.

* cited by examiner

*Primary Examiner* — Zachary M Davis

(57) ABSTRACT

A novel polymer mixture having fast drying time, a multilayer article comprising at least one layer of the dried polymer mixture and having good mechanical properties, and a method of preparing the multilayer article.

19 Claims, No Drawings

POLYMER MIXTURE, MULTILAYER ARTICLE CONTAINING THE SAME, AND PROCESS OF PREPARING THE MULTILAYER ARTICLE

FIELD OF THE INVENTION

The present invention relates to a polymer mixture and a multilayer article comprising at least one layer of the polymer mixture which has been dried, and a method of preparing the multilayer article.

INTRODUCTION

Synthetic sports track surfaces such as running track surfaces are typically made from a polymer mixture of rubber and binder systems. Synthetic sports track surfaces in the market typically include water-permeable type and water-impermeable type. Among them, water-impermeable sport track surfaces are commonly used in sports fields for professional competition and/or in cold areas.

Sport track surfaces made from conventional two-component polyurethane binders are dominant in the market due to their satisfactory flexibility, wear-resistance, anti-slip property, and easy maintenance. These conventional two-component polyurethane binders usually comprise toluene diisocyanate (TDI) or methylene diphenyl diisocyanate, organic solvents, and/or heavy metal-containing catalysts, which may be toxic or environmentally unfriendly.

Compared to conventional two-component polyurethane binders, acrylic latex binders have much less environmental concerns. Acrylic latex binders are widely used in preparing tennis court surfaces and sometimes used to prepare water-permeable running tracks whose surfaces typically have a thickness ≥13 millimeters (mm). However, acrylic latex binders are seldom used in water-impermeable running tracks applications. The content of binders in water-impermeable running tracks is much higher than in water-permeable running tracks, thus very few gaps exist among rubber particles in water-impermeable running tracks. Free water in a waterborne binder matrix is difficult to completely dry out in the central area of the thick base layer of water-impermeable running tracks, resulting in unacceptable low drying speed during application or even poor mechanical performance.

Therefore, it is desirable to provide a novel polymer mixture system that is suitable for preparing water-impermeable running track surfaces that have sufficient tensile strength and tensile elongation to meet the standard requirements such as GB/T 14833-2011 standard.

SUMMARY OF THE INVENTION

The present invention provides a novel polymer mixture of an aqueous binder composition comprising one or more acrylic emulsion (co)polymers, a crosslinking agent comprising a water-dispersible isocyanate composition, and a foaming agent; and vulcanized or crosslinked rubber powder, which is suitable for preparing base layers of water-impermeable running tracks. The polymer mixture is substantially free of benzene, toluene/xylene, and TDI. For example, the concentration of benzene, toluene/xylene, and TDI is <10 mg per 1 kg of the aqueous binder composition. The polymer mixture of the present invention forms voids in the acrylic emulsion (co)polymers matrix upon drying, for example, the matrix has a voids content of from 5% to 50% or from 10% to 40%, as measured by the method described in the Examples section below. A layer formed from the polymer mixture with a thickness of more than 2 mm, or even more than 5 mm, dries at room temperature (20-25° C.) at an acceptable drying speed, that is, the obtained layer being walkable after applying the polymer mixture to a substrate for about 24 hours. A multilayer article comprising a base layer made from the polymer mixture and a top layer made from an aqueous top coating composition shows sufficient tensile strength and tensile elongation to meet the requirements of the GB/T 14833-2011 standard for water-impermeable running track surfaces (item 4.1.4, page 2). The GB/T 14833-2011 standard herein is the national standard for synthetic materials track surfaces, which was published by General Administration of Quality Supervision, Inspection and Quarantine of the People's Republic of China (P. R. China) and Standardization Administration of the P. R. China, issued on Dec. 5, 2011, and put into effect on May 1, 2012. The process of preparing the multilayer article of the present invention is free of troublesome smell and no fire risks during construction as compared to solvent based polyurethane binders. The obtained multilayer article has substantially no volatile organic residues.

In a first aspect, the present invention is a polymer mixture comprising an aqueous binder composition and vulcanized or crosslinked rubber, wherein the aqueous binder composition comprises:
(a) an acrylic emulsion (co)polymer;
(b) a crosslinking agent comprising a water-dispersible isocyanate composition; and
(c) a foaming agent;
wherein the vulcanized or crosslinked rubber comprises rubber powder having a sieve particle size less than 0.5 mm; and the weight ratio of the total solids weight of the acrylic emulsion (co)polymers to the total weight of the vulcanized or crosslinked rubber is from 1:4 to 1:0.2.

In a second aspect, the present invention is a multilayer article comprising:
(i) a base layer of dried polymer mixture of the first aspect; and
(ii) a top layer made from an aqueous top coating composition comprising an acrylic emulsion (co)polymer and vulcanized or crosslinked rubber.

In a third aspect, the present invention is a method of preparing the multilayer article of the second aspect. The method comprises:
(1) providing a polymer mixture of the first aspect;
(2) applying the polymer mixture to a substrate;
(3) drying and curing the polymer mixture to form a base layer;
(4) providing the aqueous top coating composition;
(5) applying the top coating composition to the base layer; and
(6) drying and curing the top coating composition to form a top layer, such that the base layer resides between the substrate and the top layer.

DETAILED DESCRIPTION OF THE INVENTION

The term "aqueous" herein means water or a mixture of water with 50 wt % or less of water-miscible solvent, based on the weight of the mixture. The term "acrylic" herein refers to (meth)acrylic acid, (meth)alkyl acrylate, (meth) acrylamide, (meth)acrylonitrile and modified forms thereof, for example, (meth)hydroxyalkyl acrylate. The term "(meth) acrylic" refers to any of acrylic, methacrylic, and mixtures thereof.

The acrylic emulsion (co)polymer useful in the present invention may comprise one or more copolymerized ethylenically unsaturated nonionic monomers. "Nonionic monomers" herein refer to polymerizable monomers that do not bear an ionic charge between pH=1-14. Examples of suitable ethylenically unsaturated nonionic monomers include (meth)acrylic ester monomers such as methyl acrylate, ethyl acrylate, butyl acrylate, 2-ethylhexyl acrylate, nonyl acrylate, decyl acrylate, lauryl acrylate, hydroxyethyl acrylate, hydroxypropyl acrylate, methyl methacrylate, ethyl methacrylate, butyl methacrylate, nonyl methacrylate, isodecyl methacrylate, lauryl methacrylate, hydroxyethyl methacrylate, 1,3-butanediol dimethacrylate, and hydroxypropyl methacrylate; acrylamide; (meth)acrylonitrile; styrene and substituted styrene; or mixtures thereof. The ethylenically unsaturated nonionic monomers preferably comprise (meth)acrylic ester monomers, or their combination with styrene. In a preferred embodiment, the ethylenically unsaturated nonionic monomers comprise only (meth)acrylic ester monomers. The acrylic emulsion (co)polymer useful in the present invention may comprise, based on the solids weight of the acrylic emulsion (co)polymer, 70 weight percent (wt %) or more of the copolymerized nonionic monomer, 75 wt % or more, or even 80 wt % or more, and at the same time, 99.5 wt % or less, 95 wt % or less, or even 90 wt % or less.

The acrylic emulsion (co)polymer useful in the present invention may also comprise one or more copolymerized ethylenically unsaturated monomers having one or more functional groups. The functional groups may be selected from carbonyl, acetoacetate, alkoxysilane, carboxyl, ureido, amide, imide, amino group, or mixtures thereof. Preferably, an ethylenically unsaturated monomer bearing a carbonyl group such as diacetone acrylamide is used. Examples of suitable functional-group-containing ethylenically unsaturated monomers include ethylenically unsaturated carboxylic or dicarboxylic acids such as acrylic or methacrylic acid, itaconic acid, and maleic acid; amides, and preferably N-alkylolamides or hydroxyalkyl esters of the above-mentioned carboxylic acids, such as acrylamide, methacrylamide, N-methylolacrylamide, N-methylolmethacrylamide, 2-hydroxyethylacrylamide, 2-hydroxyethylmethacrylamide, hydroxyethyl acrylate, hydroxy ethyl methacrylate, hydroxypropyl acrylate and hydroxypropyl methacrylate; or mixtures thereof.

The acrylic emulsion (co)polymer useful in the present invention may comprise, based on the solids weight of the acrylic emulsion (co)polymer, 0.01 wt % or more of the copolymerized functional-group-containing ethylenically unsaturated monomer, 0.05 wt % or more, or even 0.1 wt % or more, and at the same time, 20 wt % or less, 10 wt % or less, or even 5 wt % or less.

In a preferred embodiment, the emulsion acrylic (co) polymer comprises, based on the solids weight of the acrylic emulsion (co)polymer, from 70 to 99.5 wt % of the copolymerized ethylenically unsaturated nonionic monomer described above, and from 0.5 to 10 wt % of the copolymerized ethylenically unsaturated monomers having one or more functional groups described above.

The acrylic emulsion (co)polymer useful in the present invention may be prepared by polymerization techniques well known in the art such as suspension polymerization or emulsion polymerization of the monomers described above. Emulsion polymerization is a preferred process. Emulsion polymerization techniques for preparing the aqueous dispersion of the acrylic emulsion (co)polymer particles are well known in the polymer arts, and include multiple stage polymerization processes. For each monomer, the concentration of the monomer based on the total weight of monomers used in preparing the aqueous dispersion of the acrylic (co)polymer is substantially the same as the concentration of copolymerized such monomer based on the solids weight of the acrylic (co)polymer. The aqueous dispersion of the acrylic (co)polymer may be prepared by emulsion polymerization from the monomers described above in the presence of a surfactant. The surfactants preferably bear an allyl group. Suitable commercially available surfactants include, for example, TREM™ LF-40 surfactant based on sodium alkyl allyl sulfosuccinate available from Cognis, ADEKA™ Resoap SR-10 reactive anionic emulsifier available from Adeka, DEXTROL™ OC-1525 surfactant based on ammonium phosphate ester nonyl phenol ethoxylate available from Dexter, LATEMUL™ PD-104 anionic polymerizable surfactant available from Kao Chemicals, HITENOL™ KH-10 anionic polymerizable surfactant available from Dai-ichi Kogyo Seiyaku Co. Ltd, or mixtures thereof. The amount of the surfactant used is usually from 0.01 to 10 wt %, from 0.3 to 5 wt %, or from 0.5 to 2 wt %, based on the total weight of monomers. The emulsion polymerization process may be conducted in the presence of a chain transfer agent. Examples of suitable chain transfer agents include 3-mercaptopropionic acid, dodecyl mercaptan, methyl 3-mercaptopropionate, benzenethiol, azelaic alkyl mercaptan, or mixtures thereof. The train transfer agent may be used in an effective amount to control the molecular weight of the obtained acrylic emulsion polymer. For example, the concentration of the chain transfer agent may be, based on the total weight of monomers, from 0.01 to 5 wt %, from 0.05 to 3 wt %, or from 0.1 to 2 wt %. In addition, free radical initiators may be used in the emulsion polymerization process.

The acrylic emulsion (co)polymer useful in the present invention may be in the form of an emulsion. The emulsion may have solids from 30 to 70 wt %, from 35 to 68 wt %, or from 40 to 65 wt %, based on the total weight of the emulsion.

In some embodiments, the aqueous acrylic emulsion (co)polymer is a mixture of a first acrylic emulsion (co) polymer having a $T_g$ of −5° C. or less, and a second acrylic emulsion (co)polymer having a $T_g$ of at least 15° C. The $T_g$ values of acrylic emulsion (co)polymers used herein are those calculated by using the Fox equation (T. G. Fox, Bulletin of the American Physical Society., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of $M_1$, and $T_g(M_2)$ is the glass transition temperature of the homopolymer of $M_2$, all temperatures being in K. The glass transition temperatures of monomers may be found, for example, in "Polymer Handbook", edited by J. Brandrup and E. H. Immergut, Interscience Publishers.

The first acrylic emulsion (co)polymer useful in the present invention may have a $T_g$ of −5° C. or lower, −6° C. or lower, −8° C. or lower, or even −10° C. or lower, and at the same time, −50° C. or higher, −45° C. or higher, or even −40° C. or higher. Suitable commercially available first acrylic emulsion (co)polymer emulsions include, for example, ELASTENE™ 2848NG and RHOPLEX™ EC-2540 acrylic emulsions both available from The Dow Chemical Company (ELASTENE and RHOPLEX are trademarks of The Dow Chemical Company); or mixtures thereof.

The concentration of the first acrylic emulsion (co)polymer in the aqueous binder composition may be, by solids based on the total solids weight of the acrylic emulsion (co)polymers in the aqueous binder composition, 5 wt % or more, 10 wt % or more, 15 wt % or more, or even 20 wt % or more, and at the same time, 95 wt % or less, 90 wt % or less, or even 80 wt % or less.

The second acrylic emulsion (co)polymer may have a $T_g$ of at least 15° C., 18° C. or higher, or even 20° C. or higher, and at the same time, 60° C. or less, 50° C. or less, or even 40° C. or less. Suitable commercially available second acrylic emulsion (co)polymer emulsions include, for example, PRIMAL™ AC 261 P and PRIMAL TX-100 acrylic emulsions both available from The Dow Chemical Company (PRIMAL is a trademark of The Dow Chemical Company); or mixtures thereof.

The concentration of the second acrylic emulsion (co) polymer in the aqueous binder composition may be, by solids based on the total solids weight of acrylic emulsion (co)polymers in the aqueous binder composition, 5 wt % or more, 10 wt % or more, 15 wt % or more, or even 20 wt % or more, and at the same time, 95 wt % or less, 90 wt % or less, or even 80 wt % or less.

Total amounts of acrylic emulsion (co)polymers in the aqueous binder composition may be, by solids based on the total solids weight of the aqueous binder composition, in an amount of 20 wt % or more, 30 wt % or more, or even 40 wt % or more, and at the same time, 70 wt % or less, 65 wt % or less, or even 60 wt % or less.

The aqueous binder composition useful in the present invention may further comprise a crosslinking agent. "Crosslinking agent" herein refers to a compound that has two or more reactive groups and that is capable of reacting with reactive groups attached to polymer chains to form crosslinks between polymer chains. The reactive groups on the crosslinking agent may be the same as or different from the reactive groups attached to the polymer chains.

The crosslinking agent useful in the present invention may comprise a water-dispersable isocyanate composition. The water-dispersible isocyanate composition useful in the present invention may comprise an isocyanate compound and a modified isocyanate compound comprising at least one anionic group, at least one polyethylene oxide segment, or both an anionic group and a polyethylene oxide segment. In some embodiments, the water-dispersible isocyanate composition comprises the isocyanate compound, a modified isocyanate compound comprising the anionic group, and a modified compound comprising the polyethylene oxide segment. As used herein, an anionic group is a chemical group that carries negative charge. The negative charge may be −1, −2, or −3. A compound with an anionic group is associated with one or more cations. The associated cation may be a metal cation or an organic compound with a cationic group, a group having a positive charge of +1, +2, or +3. When a compound with an anionic group is in solid form or is in a nonpolar environment, the associated cation(s) is located adjacent to the anionic group. When such a compound is dissolved or dispersed in water, the anionic group and the associated cation(s) may be separated. Preferred anionic group is sulphonate, carboxylate, carboxylic acid group, phosphonate, or a mixture thereof. Suitable commercially available water-dispersible isocyanate compositions include, for example, BAYHYDUR™ XP2655 hydrophilic aliphatic polyisocyanate based on hexamethylene diisocyanate available from Bayer Material Science AG.

Preferably, the isocyanate compound in the water-dispersible isocyanate composition is a polyisocyanate compound having two or more isocyanate (NCO) groups. The polyisocyanate compound maybe an aliphatic polyisocyanate, an aromatic polyisocyanate, or mixtures thereof. Examples of suitable aliphatic polyisocyanates are 1,6-hexamethylene diisocyanate (HDI), 1-isocyanato-3-isocyanatomethyl-3,5, 5-trimethyl-cyclohexane (IPDI), 4,4'-diisocyanato dicyclohexylmethane ($H_{12}$MDI), di-isocyanatomethyl-cyclohexane (ADI), isomers thereof, polymers thereof, or mixtures thereof. The isocyanate compound is preferably an aromatic polyisocyanate. Examples of suitable aromatic polyisocyanates are toluylene-2,4-diisocyanate (2,4-TDI), toluylene-2, 6-diisocyanate (2,6-TDI), naphthylene-1,5-diisocyanate, diphenylmethane-4,4'-diisocyanate (MDI), isomers thereof, polymers thereof, and mixtures thereof. Preferred polyisocyanate compounds comprise HDI trimer, polymeric MDI, or mixtures thereof. "Polymeric MDI" herein refers to a mixture of diphenylmethane diisocyanate, and its oligomer or polymer.

The concentration of the isocyanate compound in the water-dispersible isocyanate composition may be, based on total solids weight of the water-dispersible isocyanate composition, 1 wt % or more, 20 wt % or more, or even 50 wt % or more, and at the same time, 95 wt % or less, 90 wt % or less, or even 80 wt % or less.

In some embodiments, the modified isocyanate compound in the water-dispersible isocyanate composition may comprise one or more compounds having the structure of Formula (I):

$$A1\text{-}L1\text{-}(CH_2CH_2O)_n\text{—}Z \qquad \text{Formula (I)}$$

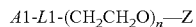

wherein A1 has the following structure:

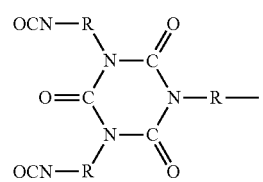

Formula (II)

L1 is a linking group formed by a reaction of an isocyanate group with an isocyanate-reactive group, n is 5 to 25, and Z is an alkyl group.

n may be 7 or more, or even 10 or more, and at the same time, 18 or less, or even 14 or less. Z may be linear, branched, cyclic, or a combination thereof. Z may be a linear or branched alkyl group having 1 to 8 carbon atoms, or 1 to 4 carbon atoms. Preferably, Z is methyl.

A1 is the residue of a diisocyanate trimer (a1). The diisocyanate trimer (a1) may be an aliphatic diisocyanate. Preferably, the diisocyanate trimer (a1) is HDI trimer, IPDI trimer, $H_{12}$MDI trimer, ADI trimer, or a mixture thereof. More preferably, the diisocyanate trimer (a1) is HDI trimer or ADI trimer.

L1 may be a urea group or a urethane group. Preferably, L1 is a urethane group. For example, when an isocyanate group reacts with a hydroxyl group or with an amine group, the resulting linking group L1 is a urethane group having the structure of Formula (III)-1 or a urea group having the structure of Formula (111)-2, respectively:

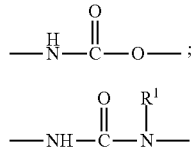
Formula (III)-1

Formula (III)-2 wherein $R^1$ is an organic group.

In some embodiments, the modified isocyanate compound in the water-dispersible isocyanate composition may comprise one or more compounds having the structure of Formula (IV):

$$A2\text{-}L2\text{-}Q\text{-}G \quad \text{Formula (IV)}$$

wherein residue A2 may be identical or different with A1, and A2 has the structure of Formula (II) as described above; L2 is a linking group formed by a reaction of an isocyanate group with an isocyanate-reactive group; Q is an organic group; and G is an anionic group.

L2 may be a urea group or a urethane group. Preferably, L2 is a urea group having the structure of Formula (111)-2. More preferably, L2 is a urea group having the structure of Formula (111)-2 wherein $R^1$ is an unsubstituted alkyl group, preferably an alkyl group having 4 to 8 carbon atoms, and more preferably cyclohexyl. Q may be an alkyl group that is linear, branched, cyclic, or a combination thereof. Preferably, Q is a linear alkyl group. More preferably, Q is —$(CH_2)_n$— wherein n is 1 to 8, and preferably n is 3. G may be sulfonate, carboxylate, a carboxylic acid group, or phosphonate. Preferably, G is sulfonate.

In a preferred embodiment, the water-dispersible isocyanate composition useful in the present invention comprises a mixture of the modified isocyanate compounds of Formula (I) and Formula (IV). The weight ratio of the modified isocyanate compound of Formula (I) to the modified isocyanate compound of Formula (IV) may be 0.01:1 or more, 0.25:1 or more, 0.43:1 or more, or even 0.67:1 or more, and at the same time, 100:1 or less, 4:1 or less, 2.3:1 or less, or even 1.5:1 or less.

The water-dispersible isocyanate composition useful in the present invention may be prepared according to any known methods. The method of preparing the water-dispersible isocyanate composition may comprise reacting an isocyanate compound with an anionic compound and/or a non-ionic compound. Examples of suitable isocyanate compounds for preparing the water-dispersible isocyanate composition include those isocyanate compounds described above in the water-dispersible isocyanate composition. The anionic compound may comprise the anionic group described above. The non-ionic compound may comprise the polyethylene oxide segment described above. In a preferred embodiment, the water-dispersible isocyanate composition is prepared by reacting the non-ionic and/or anionic compound with a first isocyanate compound, then mixing the resultant modified isocyanate with a second isocyanate compound. The first isocyanate compound and the second isocyanate compound may be the same or different.

In some preferred embodiments, the crosslinking agent in the aqueous binder composition further comprises one or more epoxy silanes. Surprisingly, the combination of the epoxy silane and the water-dispersible isocyanate composition can further improve the water resistance property of the resultant cured polymer mixture. An epoxy silane means a functional silane having at least one epoxy group. A preferred epoxy silane has the structure of Formula (V):

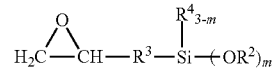
Formula (V)

wherein $R^2$ is an alkyl group having one to 6 carbon atoms; $R^3$ is a bivalent organic group having a molecular weight of 200 or less; $R^4$ is a hydrogen atom or an alkyl, aryl, or aralkyl group having one to 20 carbon atoms; and m is one, 2 or 3.

Examples of suitable epoxy silanes include 3-glycidoxypropyltrimethoxysilane; 3-glycidoxypropylmethyldiethoxysilane; 3-glycidoxypropyltriethoxysilane; beta-(3,4-epoxycyclohexyl)ethyltriethoxysilane; or mixtures thereof. Suitable commercially available epoxy silanes include, for example, SILQUEST™ A-187, SILQUEST WetLink 78, SILQUEST A-186, and COATOSIL™ 2287 epoxy silanes all available from Momentive Performance Materials; or mixtures thereof. When the epoxy silane is used, the weight ratio of the water-dispersible isocyanate composition to the epoxy silane may be 0.1:1 or more, 0.5:1 or more, or even 1.5:1 or more; and at the same time, 10:1 or less, 5:1 or less, or even 2.5:1 or less.

The concentration of total crosslinking agents in the aqueous binder composition may be, based on the total solids weight of the acrylic emulsion (co)polymer, 2 wt % or more, 4 wt % or more, or even 6 wt % or more, and at the same time, 40 wt % or less, 30 wt % or less, or even 16 wt % or less.

The aqueous binder composition useful in the present invention may further comprise one or more foaming agents. "Foaming agent" herein refers to a compound that can generate air voids inside materials to form porous structure. Examples of suitable foaming agents include fatty acid salts such as sodium oleate, alkylsulfonate such as sodium alkylsulfonate and sodium alkylbenzenesulfonate, or mixtures thereof. The concentration of the foaming agent may be, based on the total solids weight of the aqueous binder composition, from 0.02 to 6.0 wt %, from 0.04 to 3.0 wt %, or from 0.1 to 1.5 wt %.

The aqueous binder composition in the polymer mixture of the present invention may further comprise one or more foam stabilizers. "Foam stabilizer" herein refers to a compound used to improve the stability of foams and prolong the period of bubble breaking. Foam stabilizers may include, for example, polyethoxylated silicone, non-ionic surfactants, fatty alcohols, fatty acids, or mixtures thereof. Examples of suitable foaming stabilizers include polyvinyl alcohol, starch, fat acid diethanolamide, ammonium stearate, or mixtures thereof. The concentration of the foam stabilizer may be, based on the total solids weight of the aqueous binder composition, from 1.0 to 10.0 wt %, from 1.5 to 8.0 wt %, or from 2.0 to 6.0 wt %.

The aqueous binder composition useful in the present invention may further comprise a silicone dispersion. The concentration of the silicone dispersion may be, by solids based on the total solids weight of the aqueous binder composition, from 1.0 to 5.0 wt %, from 0.2 to 3.0 wt %, or from 0.5 to 2.0 wt %.

The aqueous binder composition useful in the present invention may further comprise one or more rheology modifiers. The rheology modifiers may be polyvinyl alcohol, clay materials, acid derivatives, acid copolymers, urethane associate thickeners (UAT), polyether urea polyurethanes (PEUPU), polyether polyurethanes (PEPU), or mixtures thereof. Examples of suitable rheology modifiers include alkali swellable emulsions (ASE) such as sodium or ammonium neutralized acrylic acid polymers; hydrophobically modified alkali swellable emulsions (HASE) such as hydrophobically modified acrylic acid copolymers; associative rheology modifiers such as hydrophobically modified ethoxylated urethanes (HEUR); and cellulosic rheology modifiers such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the rheology modifier is based on HEUR, for example, ACRYSOL™ RM-8W non-ionic rheology modifier available from The Dow Chemical Company (ACRYSOL is a trademark of The Dow Chemical Company). When present, the concentration of the rheology modifier may be, based on the total solids weight of the aqueous binder composition, from 0.001 to 3.0 wt %, from 0.002 to 2.0 wt %, or from 0.005 to 0.3 wt %.

The aqueous binder composition useful in the present invention may further comprise water. The concentration of water may be, based on the total weight of the aqueous binder composition, from 10 to 90 wt %, from 20 to 80 wt %, or from 30 to 70 wt %.

In addition to the components described above, the aqueous binder composition useful in the present invention may further comprise any one or combination of the following additives: inorganic extenders, pigments, fillers, buffers, neutralizers, dispersants, humectants, mildewcides, biocides, anti-skinning agents, colorants, flowing agents, antioxidants, plasticizers, leveling agents, dispersants, adhesion promoters, diluents and grind vehicles. When present, these additives may be in an amount of from 0.001 to 20 wt %, or from 0.01 to 4 wt %, based on the total solids weight of the aqueous binder composition.

The polymer mixture of the present invention may further comprises vulcanized or crosslinked rubber. Examples of suitable vulcanized or crosslinked rubber useful in the present invention comprise styrene butadiene rubber (SBR), ethylene-propylene-diene monomer (EPDM) rubber, ethylene propylene rubber, butadiene rubber, natural rubber, styrene butadiene copolymer, hydrogenated nitrile, nitrile rubber, neoprene, polychloroprene, ground tire rubber (GTR), waste rubber, waste rubber vulcanizate, or mixtures thereof. Preferably, waste vulcanized or crosslinked rubber is used; such waste rubber may come from any known sources, such as, for example, tires, shoe soles, and ground tire rubber. More preferably, waste tire rubber is used.

The vulcanized or crosslinked rubber in the polymer mixture may comprise rubber powder having a sieve particle size less than 0.5 millimeter (mm), less than 0.3 mm, less than 0.1 mm, or even less than 0.05 mm. In some embodiments, the vulcanized or crosslinked rubber useful in the present invention may further comprise rubber particles having a sieve particle size of 0.5 mm or more, 1 mm or more, or even 2 mm or more, and at the same time, 6 mm or less, 5 mm or less, or even 4 mm or less. The vulcanized or crosslinked rubber in the polymer mixture may comprise, based on the total weight of the vulcanized or crosslinked rubber, from 10 to 100 wt %, from 20 to 80 wt %, or from 40 to 60 wt % of the rubber powder; and the rest of the vulcanized or crosslinked rubber are the rubber particles.

The weight ratio of total solids weight of acrylic emulsion (co)polymers to the total weight of the vulcanized or crosslinked rubber in the polymer mixture of the present invention may be from 1:4 to 1:0.2. The weight ratio may be 1:0.5 or lower, 1:1 or lower, and at the same time, 1:3 or higher, 1:2 or higher, 1:1 or higher.

The polymer mixture of the present invention may be obtained by firstly preparing the aqueous binder composition, and then mixing it with the vulcanized or crosslinked rubber. The aqueous binder composition may be supplied in two parts: the acrylic emulsion (co)polymer(s), foaming agent, and optionally additional components such as the rheology modifier and the foam stabilizer usually form "Part A"; and the crosslinking agent comprising the water-dispersible isocyanate composition usually forms "Part B". When used, the epoxy silane may be present in Part A and/or Part B. The polymer mixture of the present invention may be prepared by mixing Part A and Part B to form the aqueous binder composition, then mixing with the vulcanized or crosslinked rubber.

Surprisingly, a water-impermeable base layer based on the polymer mixture of the present invention is capable of drying at room temperature, while a base layer obtained from a conventional polymer mixture containing an acrylic latex binder and rubber particles while not containing the crosslinking agent, the foaming agent and the rubber powder, does not thoroughly dry even after about 5 days at room temperature. In one lab trial, a 6-10 mm thick base layer made with the polymer mixture of the present invention thoroughly dried after 24 hours at 25 to 28° C.

The polymer mixture of the present invention may be cured at a temperature of generally from 5 to 80° C., from 10 to 50° C., from 15 to 40° C., or from 20 to 35° C. The time of curing the polymer mixture may be chosen between 60 minutes to 48 hours, between 6 hours to 36 hours, or between 12 hours to 24 hours. It is also operable to partially cure the polymer mixture and then complete the curing process at a later time.

The multilayer article of the present invention may comprise at least one layer made from the polymer mixture. The multilayer article may comprise: (i) a base layer of the dried polymer mixture, and (ii) a top layer made from an aqueous top coating composition comprising at least one acrylic emulsion (co)polymer and vulcanized or crosslinked rubber.

Examples of suitable acrylic emulsion (co)polymers for the top layer are as described in the polymer mixture above for the base layer. In some embodiments, the acrylic emulsion (co)polymer used in the top layer is a mixture of the first acrylic emulsion (co)polymer having a glass transition temperature of −5° C. or less, and the second acrylic emulsion (co)polymer having a glass transition temperature of at least 15° C. In some preferred embodiments, the aqueous top coating composition may comprise: the first acrylic emulsion (co)polymer having a glass transition temperature of −5° C. or less, the second acrylic emulsion (co)polymer having a glass transition temperature of at least 15° C., the crosslinking agent comprising a water-dispersible isocyanate composition, and vulcanized or crosslinked rubber.

In some embodiments, the vulcanized or crosslinked rubber in the top layer is rubber particles. The vulcanized or crosslinked rubber particles in the top layer are the rubber particles as described above which are optionally present in the polymer mixture above. Preferably, the vulcanized or crosslinked rubber particles in the top layer may have a sieve particle size of from 0.5 to 5 mm or from 1 to 3 mm. The vulcanized or crosslinked rubber particles are preferably EPDM rubber particles. In the top layer of the multilayer article of the present invention, the weight ratio of total acrylic emulsion (co)polymers to the vulcanized or crosslinked rubber may be is from 1:2 or lower, or 1:2.5 or lower, and at the same time, 1:3.5 or higher, or even 1:3 or higher, or even 1:4 or higher. The concentration of other components in the aqueous top coating composition may be in the concentration ranges as described in the polymer mixture.

The aqueous top coating composition can further comprise the optionally additional components as described for the aqueous binder composition in the polymer mixture, above, except the foaming agent. The top layer may be generally prepared by mixing the individual components with one another, applying to the base layer, and then drying and curing the aqueous top coating composition to form the top layer.

The multilayer article of the present invention may further comprise a primer layer, such that the base layer resides between the top layer and the primer layer. The primer layer may be used to further improve the adhesion of the multilayer article to a substrate. The primer layer may be made from an aqueous primer composition. The aqueous primer composition useful in the present invention may comprise the acrylic emulsion (co)polymer described above. The aqueous primer composition may further comprise the epoxy silane described above to further improve adhesion of the resultant multilayer article to a substrate under wet conditions. The aqueous primer composition may also comprise the water-dispersible isocyanate composition described above. In a preferred embodiment, the aqueous primer composition comprises the first and second acrylic emulsion (co)polymers, the epoxy silane, and the water-dispersible isocyanate composition. Concentration of the above components in the aqueous primer composition may have the same ranges described above as they are in the aqueous binder composition.

The multilayer article of the present invention may further comprise other functional layers. For example, the multilayer article may further comprise a protective layer, so that the top layer resides between the protective layer and the base layer. The presence of the protective layer may be useful to further improve abrasion resistance and aging resistance of the multilayer article.

The multilayer article of the present invention may have a thickness of 10 mm or more, 12 mm or more, or even 13 mm or more. The volume ratio of the base layer to the multilayer article may be from 40 to 95%, from 50 to 90%, or from 70 to 80%, and the volume ratio of the top layer to the multilayer article may be from 5 to 60%, from 10 to 40%, or from 20 to 30%.

The multilayer article of the present invention achieves a tensile strength of at least 0.5 megapascal (MPa), and an elongation at break of at least 50%, according to the GB/T 14833-2011 standard.

The method of preparing the multilayer article of the present invention may comprise:
(1) providing the polymer mixture of the present invention; (2) applying the polymer mixture to a substrate; (3) drying and curing the polymer mixture to form the base layer; (4) providing the aqueous top coating composition; (5) applying the top coating composition to the base layer; and (6) drying and curing the top coating composition to form the top layer, such that the base layer resides between the substrate and the top layer.

In preparing the multilayer article, the polymer mixture or the top coating composition can be applied to the substrate or to the base layer, respectively, by any known methods, for example, manual troweling or machine applying using conventional equipment such as TPJ-2.5 type synthetic running track paver (Suzhou Lei Jun Sports Equipment Co., Ltd., China). The obtained surface may be further smoothed by troweling. Preferably, the top coating composition is applied to the base layer by spraying. The polymer mixture can be applied to a wet substrate or a dry substrate. The substrate can be any substrate including, for example, concrete, bitumen, metal, or wood. Preferably, the substrate is primed by an aqueous primer composition described below before applying the polymer mixture.

In preparing the multilayer article, drying and curing the polymer mixture or the top coating composition may be carried out at a predetermined temperature and for a predetermined period of time sufficient to evaporate water. Drying and curing may be conducted at ambient temperature, for example, a temperature of from 5 to 50° C., from 15 to 40° C., or from 20 to 30° C. The time of drying and curing the polymer mixture may depend on various factors including, for example, thickness of the polymer mixture applied to the substrate, and outdoor conditions such as temperature, relative humidity and wind. For example, the time for drying and curing the polymer mixture or the top coating composition may be chosen between 1 hour to 48 hours, between 6 hours to 36 hours, or between 12 to 24 hours. The method of preparing the multilayer article of the present invention can be conducted in an acceptable construction time due to the fast drying speed of the polymer mixture of the present invention. The time period between the application of the polymer mixture to the substrate and the application of the top coating composition to the base layer may be various, for example, the time can be 48 hours or less, 36 hours or less, or even 24 hours or less, and at the same time, 2 hours or more, 2.5 hours or more, or even 3 hours or more.

The method of preparing the multilayer article of the present invention may further comprise: applying the aqueous primer composition to the substrate to form a primer layer before applying the polymer mixture to the substrate to form the base and the top layers.

The method of preparing the multilayer article uses aqueous compositions in both the base layer and the top layer. The obtained multilayer has no volatile organic residues. The method can be conducted at a shorter construction time than a polymer mixture comprising an acrylic emulsion (co)polymer and rubber particles but without the crosslinking agent, the foaming agent, and the rubber powder under the same drying conditions.

The multilayer article of the present invention may be used in various applications, for example, sound proofing materials, acoustic underlayment, flooring underlayment and matting; industrial, sports utilities such as artificial track and playground surfaces, mats and pads, ball cores, and consumer products such as floor tiles, covers, molded products, and in road paving and maintenance applications. In particular, the multilayer article is suitable for use as water-impermeable running track surfaces. "Water-impermeable running track surfaces" herein refers to a synthetic track surface material that does not allow water to pass through the surface material. The cross section of the synthetic track surface material may or may not contain air voids.

Specifically desirable embodiments of the present invention include a multilayer article. One embodiment of the multilayer article of the present invention comprises the top layer, the base layer, optionally a primer layer between the base layer and a substrate, and optionally one or more other layers therebetween. Each layer comprises two opposing primary surfaces. The top layer contacts one primary surface of the base layer and the opposing primary surface of the base layer contacts the substrate, so that the base layer resides between the top layer and the substrate. An optional protective layer may be applied on one primary surface of the top layer, so that the top layer resides between the protective layer and the base layer. Generally the thickness of the base layer may be 2 mm or more, 5 mm or more, 6 mm or more, 7 mm or more, or even 8 mm or more, and at the same time, 12 mm or less or 10 mm less. The thickness of the top layer may be generally 1 mm or more, 1.5 mm or more, or even 2 mm or more, and at the same time, 5 mm or less, 4 mm or less, or even 3 mm or less. If present, the primer layer may generally have a thickness in the range of from 50 to 500 microns, from 75 to 400 microns, or from 100 to 300 microns.

EXAMPLES

Some embodiments of the invention will now be described in the following Examples, wherein all parts and percentages are by weight unless otherwise specified. The following materials and abbreviations are used in the examples:

"AA" stands for acrylic acid.
"MAA" stands for methacrylic acid.
"BA" stands for butyl acrylate.
"MMA" stands for methyl meth-acrylate.
"AN" stands for acrylonitrile.

SILQUEST A187 epoxy functional silane, available from Momentive Performance Materials Inc., is gamma-glycidoxypropyltrimethoxy silane and is used as a crosslinking agent.

Black waste tire rubber powder having a sieve particle size <0.5 mm, black waste tire rubber particles having a sieve particle size of 0.5-1 mm, black waste tire rubber particles having a sieve particle size of 1-3 mm, black waste tire rubber particles having a sieve particle size of 2-4 mm, and EPDM particles having a sieve particle size of 1-3 mm, are all available from Fujian Aoxiang Sports Plastic Rubber Co., Ltd.

The following standard analytical equipment and methods are used in the Examples.

Voids Content

The voids content of a matrix formed from an aqueous binder composition is determined as follows:

Part A and Part B of an aqueous binder composition with a volume denoted as $V_0$, are mixed at a mixing speed of 600 revolutions per minute (RPM) for 3 minutes, then further stirred at a mixing speed of 1500 RPM for 5 minutes to give a foamed binder. The volume of the foamed binder is measured and denoted as $V_1$. The voids content, denoted as C, is calculated by the following equation:

$$C=(1-V_0/V_1)*100\%$$

Tensile Strength and Elongation at Break Properties

Tensile strength and elongation at break properties of a running track sample are evaluated according to item 5.4,

|  | Acrylic Polymer Composition | $T_g$ | MFFT | pH value | Solids |
|---|---|---|---|---|---|
| First Polymer latex* | 1AA/11.6AN/83.7BA/3.7Methacrylamide | −20° C. | <0° C. | 7.5 | 50.5% |
| Second Polymer latex* | 45BA/52MMA/1MAA/2Ureido adhesion promoter | 24° C. | 18° C. | 9.5 (± 0.5) | 50% |

*Latexes are all available from The Dow Chemical Company.
$T_g$ is determined by the Fox Equation as described above.
"MFFT" refers to Minimum Film Formation Temperature and is measured according to ASTM D2354-10.

NOPCO™ NXZ defoamer, available from Henkel, is a metallic soap type defoamer.

ACRYSOL RM-8W rheology modifier is a nonionic urethane rheology modifier and is available from The Dow Chemical Company.

POLYOX™ WSR301 resin, available from The Dow Chemical Company, is a water soluble polyethylene oxide (PEO) resin and is used as a lubricant (POLYOX is a trademark of The Dow Chemical Company).

Sodium oleate (18% concentration) is used as a foaming agent and available from Sinopharm Chemical Reagent Co., Ltd.

Xianbang C-405 calcium stearate is available from Shanghai Xianbang Chemicals Co. Ltd.

COMPERLAN™ COD-FFA, available from Cognis, is fatty acid diethanolamide and used as a foam stabilizer.

Dow CORNING™ IE-2404 Emulsion, available from Dow Corning, is a silicone resin emulsion.

PVOH/24-88, available from Shanghai Jinshu Resin, is a water soluble polyvinylalcohol having a particle size of 120 mesh.

BAYHYDUR XP2487/1, available from Bayer Material Science AG, is a hydrophilic aliphatic polyisocyanate based on hexamethylene diisocyanate (HDI), containing hexamethylene-1,6-diisocyanate homopolymer, aliphatic polyisocyanate and isocyanates; and is used as a crosslinking agent.

page 3, the GB/T 14833-2011 standard. If the sample shows a tensile strength of at least 0.5 MPa, it meets the tensile strength requirement of the GB/T 14833-2011 standard. Otherwise, it fails the tensile strength requirement. If the sample shows an elongation at break of at least 50%, it meets the elongation at break requirement of the GB/T 14833-2011 standard. Otherwise, it fails the elongation at break requirement.

Example (Ex) 1

Preparation of Polymer Mixture

A polymer mixture of the present invention was formulated by mixing Part A binder, Part B binder and of Part C rubber, based on formulations described in Table 1. Part A binder was prepared by homogenously mixing the first polymer latex and second polymer latex, calcium stearate, PVOH and ACRYSOL RM-8W as rheology modifiers, COMPERLAN COD-FFA as a foam stabilizer, NOPCO NXZ as a defoamer, and IE-2404 silicone as a hydrophobic agent; and then mixing with sodium oleate as a foaming agent at a mixing speed <500 RPM. Part B was prepared by mixing BAYHYDUR XP2487/1 isocyanate cross-linker and SILQUEST A187 silane cross-linker. Part C was made by mixing rubber particle fillers with different sizes, that is, rubber powder and rubber particles.

Preparation of Aqueous Top Coating Composition

An aqueous top coating composition was made by mixing all components based on formulations described in Table 2.

Preparation of Sport Track Sample

Water-impermeable sports track samples were prepared as follows. Part A and Part B of the polymer mixture obtained above were mixed at a mixing speed of 600 RPM for 3 minutes and then a foamed binder was obtained at a higher mixing speed (1500 RPM). Then, Part C of the polymer mixture obtained above were added and mixed with the resultant foamed binder at a mixing speed of 600 RPM to obtain a fresh polymer mixture, which was then applied into a mold with trowel to form a base layer with a thickness of about 10 mm. The base layer was dried within about 1-2 days at room temperature. The aqueous top coating composition was then applied onto the base layer to form a top layer with a thickness of about 3 mm. After cured for about 24 hours, the obtained sports track samples were cut into dumbbell samples. These dumbbell samples were further exposed to dry condition (7 day at 23° C.), wet condition (7 day at 23° C.+3 days in water), and re-drying condition, respectively. Tensile properties of the resultant samples were then evaluated according to the test methods described above and were reported in Table 3.

As shown in Table 3, the running tack samples of Ex 1 showed a tensile strength of at least about 0.90 MPa and an elongation at break of about 70% under the dry condition, thus, met the tensile strength and elongation at break requirements of the GB/T 14833-2011 standard. Tensile strength and elongation at break of the resultant samples after exposing to the wet condition dropped, but were nearly fully recovered after further re-drying at 70° C. for 1 day (tensile strength of 0.82 MPa, and tensile elongation of 76.6%), which indicates the samples of Ex 1 are suitable for outdoor use. The obtained samples have a water-impermeable structure as indicated by no void visible to the naked eyes between rubber powders and particles in the cross section of the base layer. In addition, voids in the binder matrix allowed water to remove out of the binder matrix within an acceptable duration upon drying.

TABLE 1

Polymer Mixture for Base Layer

| | | Material | | Weight Part | Weight Ratio |
|---|---|---|---|---|---|
| Binder | Part A | First Polymer latex | | 62.81 | 100 |
| | | Second Polymer latex | | 31.40 | |
| | | 18% Sodium oleate | | 0.57 | |
| | | Xianbang C-405 | | 1.89 | |
| | | PVOH/24-88 | | 1.41 | |
| | | COMPERLAN COD-FFA | | 1.89 | |
| | | ACRYSOL RM-8W | | 0.03 | |
| | | NOPCO NXZ | | 0.005 | |
| | | IE-2404 | | 0.94 | |
| | Part B | BAYHYDUR XP2487/1 | | 60 | 5 |
| | | SILQUEST A187 | | 40 | |
| Rubber | Part C | Rubber particles | 2-4 mm | 50 | 75 |
| | | | 0.5-1 mm | 25 | |
| | | Rubber powder | <0.5 mm | 25 | |

*weight ratio refers to the ratio of the total weight of Part A/the total weight of Part B/the total weight of Part C.

TABLE 2

Top Coating Composition for Top Layer

| | | Material | Weight Part | Weight Ratio* |
|---|---|---|---|---|
| Binder | Part A | First Polymer latex | 63.27 | 100 |
| | | Second Polymer latex | 31.63 | |
| | | NOPCO NXZ | 0.20 | |
| | | POLYOX WSR301 | 0.15 | |
| | Part B | BAYHYDUR XP2655E | 2.85 | 4.75 |
| | | COATOSIL 2287 | 1.90 | |
| | Part C | EPDM particles (1-3 mm) | 150 | 150 |

*weight ratio refers to the ratio of the weight of Part A/the total weight of Part B/the total weight of Part C.

TABLE 3

| Property | Ex 1 | GB/T 14833-2011 (Item 4.1.4, page 2) for water-impermeable running tracks |
|---|---|---|
| Tensile Strength-dry, MPa | 0.90 | 0.50 |
| Elongation at break-dry, % | 70.01 | 50% |
| Tensile Strength-Wet, MPa | 0.40 | NA |
| Elongation at break-Wet, % | 60.75 | NA |
| Tensile Strength-re-dry, MPa | 0.82 | NA |
| Elongation at break-re-dry, % | 76.6 | NA |

* Dry condition: 7 days at 23° C.
Wet condition: 7 days at 23° C. + 3 days in water
Re-drying condition: 7 days at 23° C. + 3 days in water + 1 day at 70° C.

Ex 2

Sports track samples of Ex 2 were prepared according to the same procedure and using the same top coating composition for the top layer as described in Ex 1. The polymer mixture for the base layer was prepared based on formulations described in Table 4. Properties of the resultant sports track samples after exposing to different conditions were reported in Table 5.

TABLE 4

Polymer Mixture for Base Layer

| | | Material | | Weight Part | Weight Ratio |
|---|---|---|---|---|---|
| Binder | Part A | First Polymer latex | | 62.81 | 100 |
| | | Second Polymer latex | | 31.40 | |
| | | 18% Sodium oleate | | 0.57 | |
| | | Xianbang C-405 | | 1.89 | |
| | | PVOH/24-88 | | 1.41 | |
| | | COMPERLAN COD-FFA | | 1.89 | |
| | | ACRYSOL RM-8W | | 0.03 | |
| | | NOPCO NXZ | | 0.005 | |
| | | IE-2404 | | 0.94 | |
| | Part B | BAYHYDUR XP2487/1 | | 60 | 5 |
| | | SILQUEST A187 | | 40 | |
| Filler | Part C | Rubber particles | 1-3 mm | 16.67 | 70 |
| | | | 0.5-1 mm | 16.67 | |
| | | Rubber powder | <0.5 mm | 66.66 | |

*weight ratio refers to the ratio of the total weight of Part A/the total weight of Part B/the total weight of Part C.

TABLE 5

| Property | Ex 2 |
|---|---|
| Tensile Strength-dry, MPa | 0.77 |
| Elongation at break-dry, % | 70.81 |
| Tensile Strength-wet, MPa | 0.42 |

TABLE 5-continued

| Property | Ex 2 |
| --- | --- |
| Elongation at break-wet, % | 71.27 |
| Tensile Strength-re-dry, MPa | 0.75 |
| Elongation at break-re-dry, % | 73.70 |

* Dry condition: 7 days at 23° C.
Wet condition: 7 days at 23° C. + 3 days in water
Re-drying condition: 7 days at 23° C. + 3 days in water + 1 day at 70° C.

Comparative (Comp) Ex A

Running track samples were prepared based on a comparative formulation described in Table 6. Ingredients listed in Table 6 were mixed, and the resultant mixture was then cast onto an organic glass plate to form a layer with a thickness of about 12 mm. After 5 days at room temperature, the central part of the layer was still wet and polymers could not form films. Tensile strength and elongation could not be measured due to no cohesion between EPDM particles.

TABLE 6

| Material | Weight Part |
| --- | --- |
| First polymer latex | 23.20 |
| Second polymer latex | 9.95 |
| NOPCO NXZ | 0.55 |
| EPDM particles (1-3 mm) | 66.30 |
| Total | 100.00 |

What is claimed is:

1. A polymer mixture for a multilayer article, wherein the polymer mixture comprises an aqueous binder composition and vulcanized or crosslinked rubber, wherein the aqueous binder composition comprises:
   (a) an acrylic emulsion (co)polymer;
   (b) a crosslinking agent comprising a water-dispersible isocyanate composition; and
   (c) a foaming agent; and
   wherein the crosslinking agent further comprises an epoxy silane,
   wherein the vulcanized or crosslinked rubber comprises rubber powder having a sieve particle size less than 0.5 mm; and the weight ratio of the total solids weight of the acrylic emulsion (co)polymer to the total weight of the vulcanized or crosslinked rubber is from 1:4 to 1:0.5.

2. The polymer mixture of claim 1, wherein the crosslinking agent is present in an amount of from 2 to 40 wt %, based on the total solids weight of the acrylic emulsion (co)polymer.

3. The polymer mixture of claim 1, wherein the foaming agent is selected from sodium oleate, sodium alkylsulfonate, sodium alkylbenzenesulfonate, or mixtures thereof.

4. The polymer mixture of claim 1, wherein the aqueous binder composition comprises, based on the total solids weight of the acrylic emulsion (co)polymer, from 5 to 95 wt % of a first acrylic emulsion (co)polymer having a glass transition temperature of −5° C. or less, and from 5 to 95 wt % of a second acrylic emulsion (co)polymer having a glass transition temperature of at least 15° C.

5. The polymer mixture of claim 1, wherein the acrylic emulsion (co)polymer comprises as polymerized units, at least one ethylenically unsaturated nonionic monomer, and at least one ethylenically unsaturated monomer having at least one functional group selected from carbonyl, acetoacetate, alkoxysilane, carboxyl, ureido, amide, imide or amino group, or mixtures thereof.

6. The polymer mixture of claim 1, wherein the vulcanized or crosslinked rubber further comprises rubber particles having a sieve particle size of 0.5 to 6 mm.

7. The polymer mixture of claim 1, wherein the aqueous binder composition further comprises a foaming stabilizer, a silicone dispersion, or mixtures thereof.

8. A multilayer article comprising:
   (i) a base layer of a dried polymer mixture, wherein the polymer mixture comprises an aqueous binder composition and vulcanized or crosslinked rubber, wherein the aqueous binder composition comprises:
      (a) an acrylic emulsion (co)polymer;
      (b) a crosslinking agent comprising a water-dispersible isocyanate composition; and
      (c) a foaming agent; and
      wherein the crosslinking agent further comprises an epoxy silane,
      wherein the vulcanized or crosslinked rubber comprises rubber powder having a sieve particle size less than 0.5 mm; and the weight ratio of the total solids weight of the acrylic emulsion (co)polymer to the total weight of the vulcanized or crosslinked rubber is from 1:4 to 1:0.5; and
   (ii) a top layer made from an aqueous top coating composition comprising an acrylic emulsion (co)polymer and vulcanized or crosslinked rubber.

9. The multilayer article of claim 8, wherein the top coating composition comprises:
   a first acrylic emulsion (co)polymer having a glass transition temperature of −5° C. or less,
   a second acrylic emulsion (co)polymer having a glass transition temperature of at least 15° C.,
   a crosslinking agent comprising a water-dispersible isocyanate composition, and the vulcanized or crosslinked rubber.

10. The multilayer article of claim 8, wherein the vulcanized or crosslinked rubber in the top coating composition are rubber particles having a sieve particle size of from 0.5 to 6 mm and the weight ratio of total solids weight of the acrylic emulsion (co)polymer to the weight of the vulcanized or crosslinked rubber particles is from 1:2 to 1:4.

11. The multilayer article of claim 8, wherein the multilayer has a thickness of at least 10 mm, the volume ratio of the base layer to the multilayer article is from 40 to 95%, and the volume ratio of the top layer to the multilayer article is from 5 to 60%.

12. The multilayer article of claim 8, wherein the multilayer article has a tensile strength of at least 0.5 MPa and an elongation at break of at least 50%, according to the GB/T 14833-2011 standard.

13. The multilayer article of claim 8, wherein the crosslinking agent is present in an amount of from 2 to 40 wt %, based on the total solids weight of the acrylic emulsion (co)polymer.

14. The multilayer article of claim 8, wherein the foaming agent is selected from sodium oleate, sodium alkylsulfonate, sodium alkylbenzenesulfonate, or mixtures thereof.

15. The multilayer article of claim 8, wherein the aqueous binder composition comprises, based on the total solids weight of the acrylic emulsion (co)polymer, from 5 to 95 wt % of a first acrylic emulsion (co)polymer having a glass transition temperature of −5° C. or less, and from 5 to 95 wt % of a second acrylic emulsion (co)polymer having a glass transition temperature of at least 15° C.

16. The multilayer article of claim 8, wherein the acrylic emulsion (co)polymer comprises as polymerized units, at least one ethylenically unsaturated nonionic monomer, and at least one ethylenically unsaturated monomer having at least one functional group selected from carbonyl, acetoacetate, alkoxysilane, carboxyl, ureido, amide, imide or amino group, or mixtures thereof.

17. The multilayer article of claim 8, wherein the vulcanized or crosslinked rubber further comprises rubber particles having a sieve particle size of 0.5 to 6 mm.

18. The multilayer article of claim 8, wherein the aqueous binder composition further comprises a foaming stabilizer, a silicone dispersion, or mixtures thereof.

19. A method of preparing the multilayer article of claim 8, comprising:
   (1) providing a polymer mixture, wherein the polymer mixture comprises an aqueous binder composition and vulcanized or crosslinked rubber, wherein the aqueous binder composition comprises:
     (a) an acrylic emulsion (co)polymer;
     (b) a crosslinking agent comprising a water-dispersible isocyanate composition; and
     (c) a foaming agent; and
   wherein the crosslinking agent further comprises an epoxy silane,
   wherein the vulcanized or crosslinked rubber comprises rubber powder having a sieve particle size less than 0.5 mm; and the weight ratio of the total solids weight of the acrylic emulsion (co)polymer to the total weight of the vulcanized or crosslinked rubber is from 1:4 to 1:0.5;
   (2) applying the polymer mixture to a substrate;
   (3) drying and curing the polymer mixture to form a base layer;
   (4) providing the aqueous top coating composition;
   (5) applying the top coating composition to the base layer; and
   (6) drying and curing the top coating composition to form a top layer, such that the base layer resides between the substrate and the top layer.

* * * * *